March 10, 1931.   J. A. WORLUND   1,795,920
TIRE SPLITTING APPARATUS
Filed June 26, 1928   5 Sheets-Sheet 5
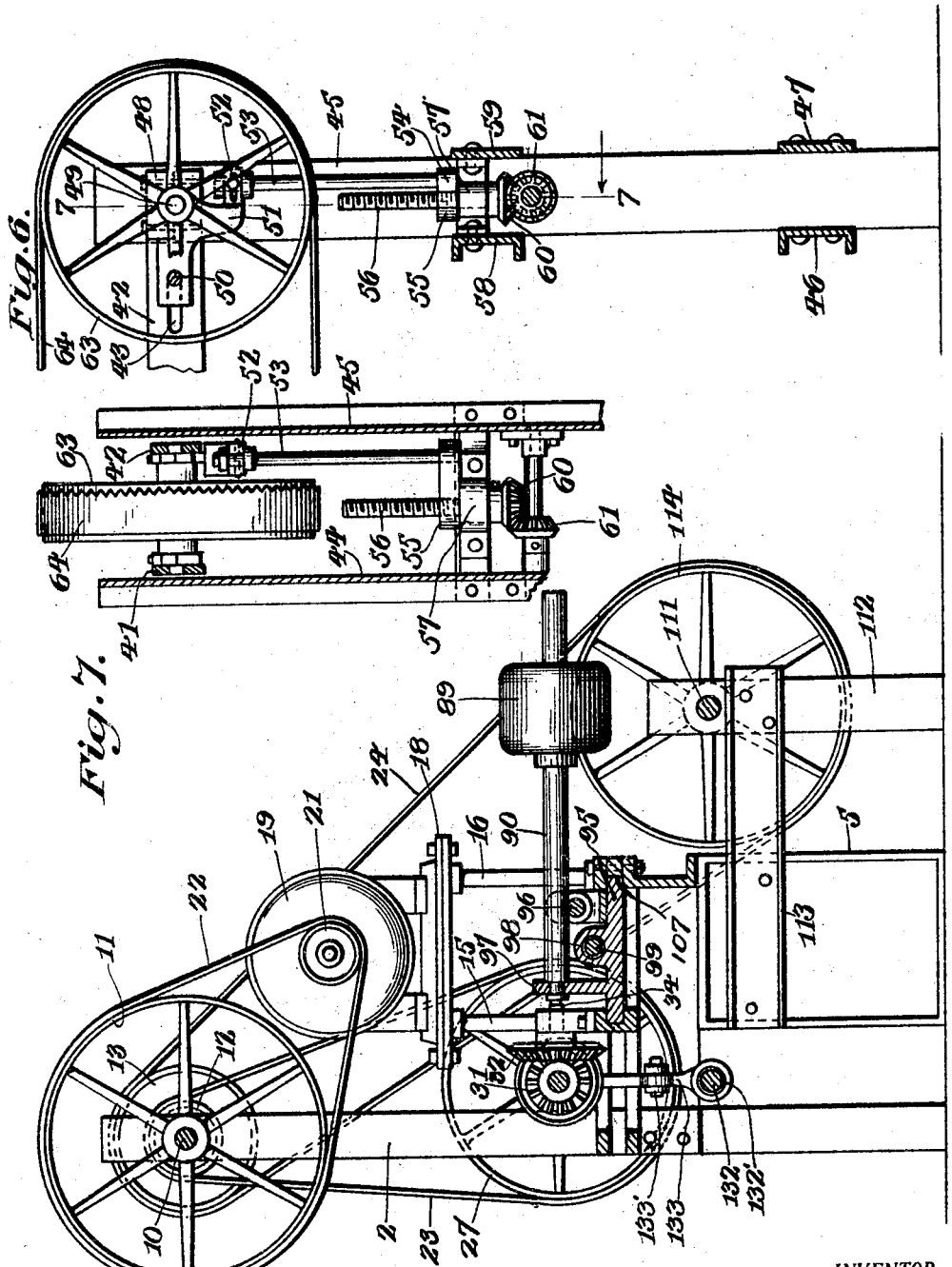
INVENTOR.
John A. Worlund,
BY Geo. P. Kimmel
ATTORNEY.

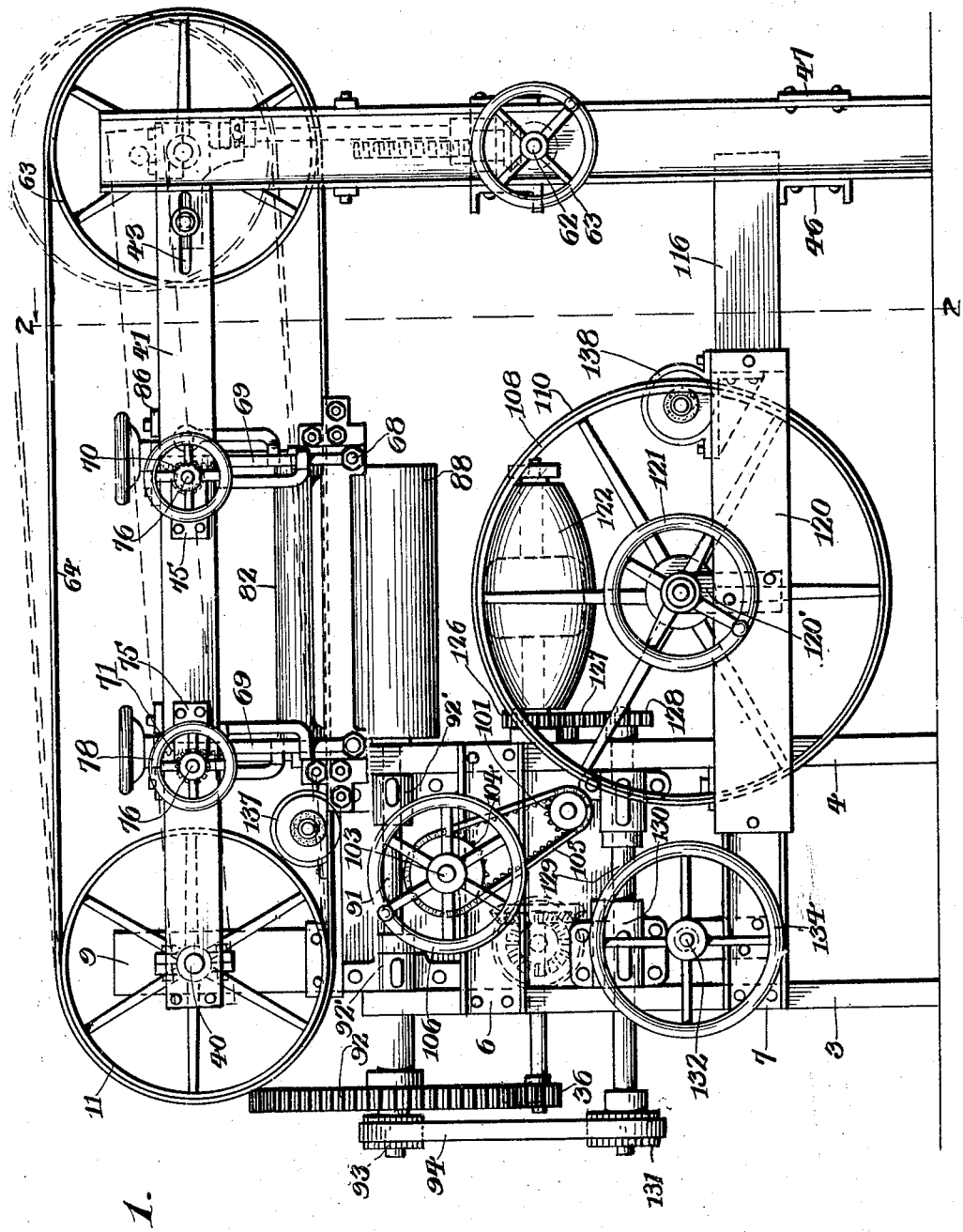

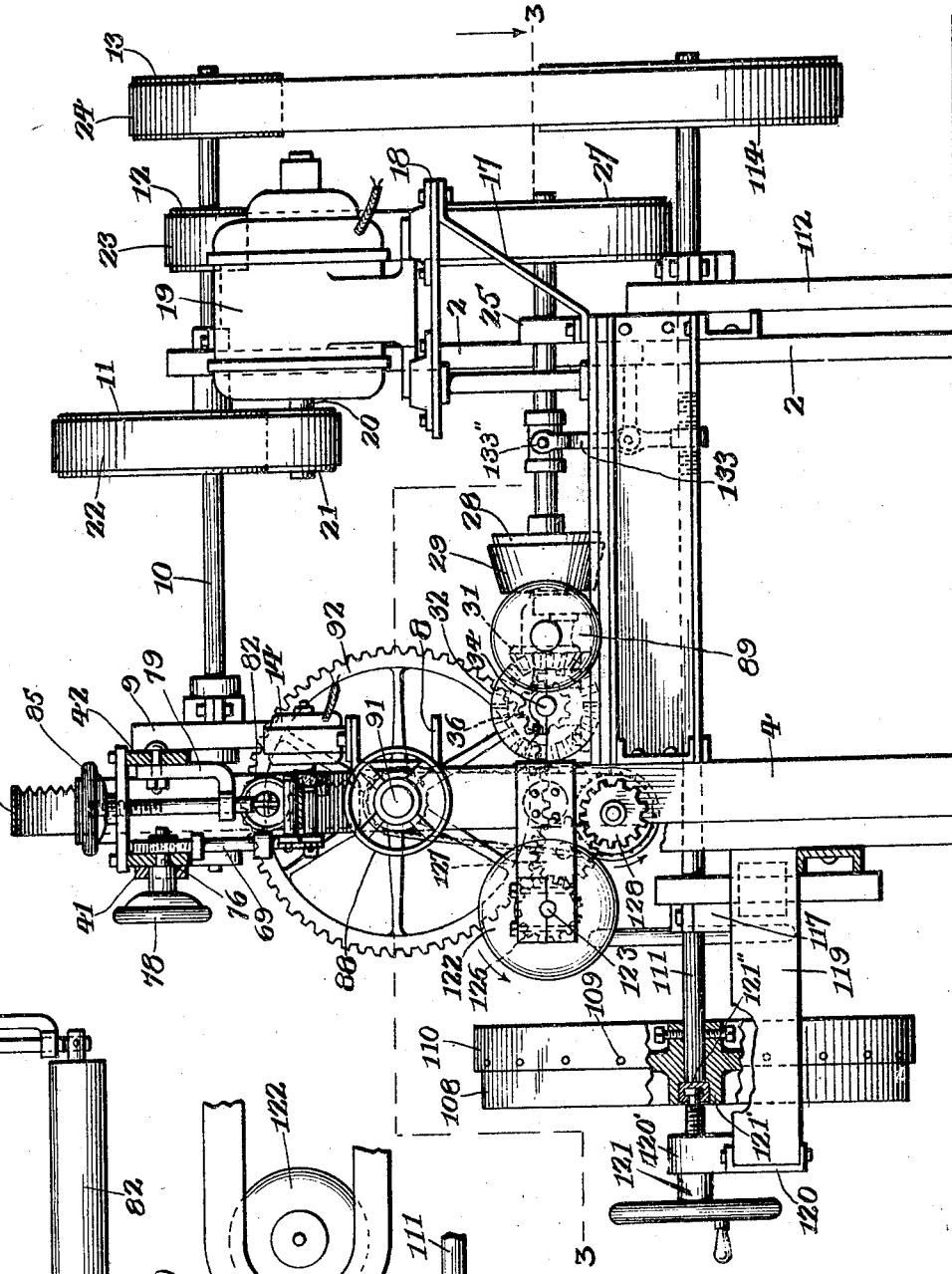

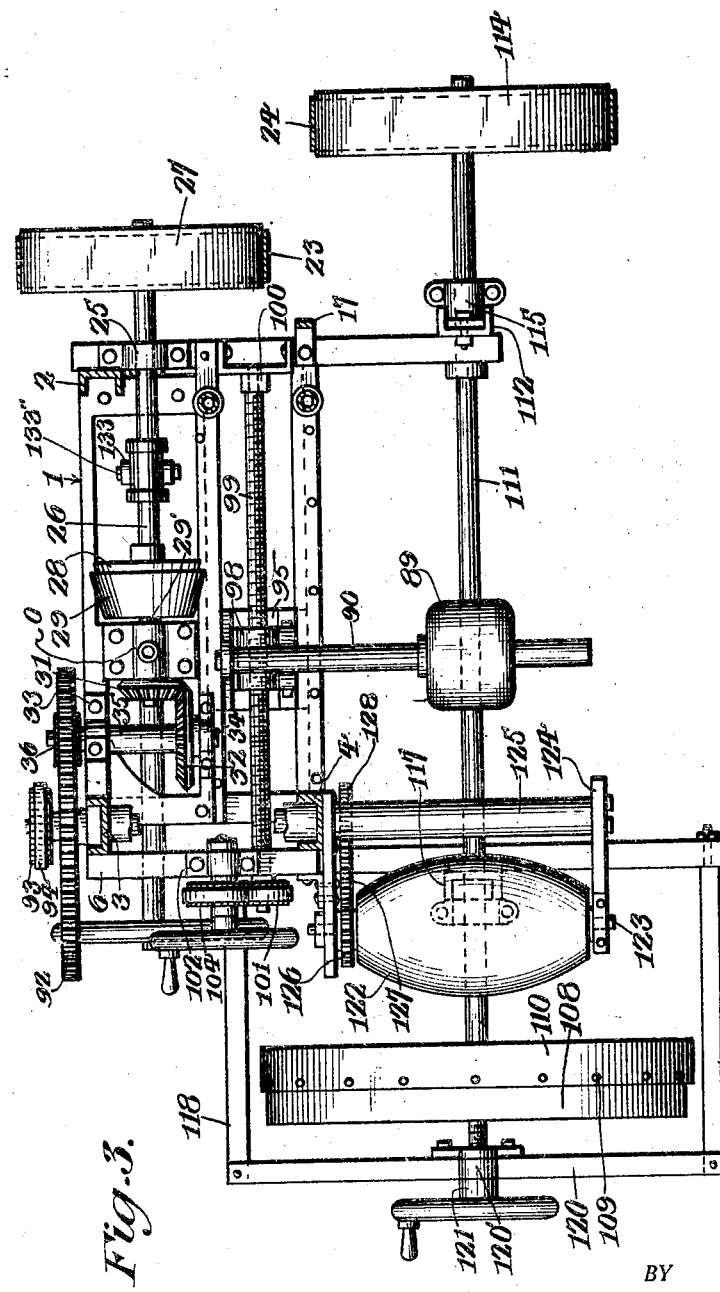

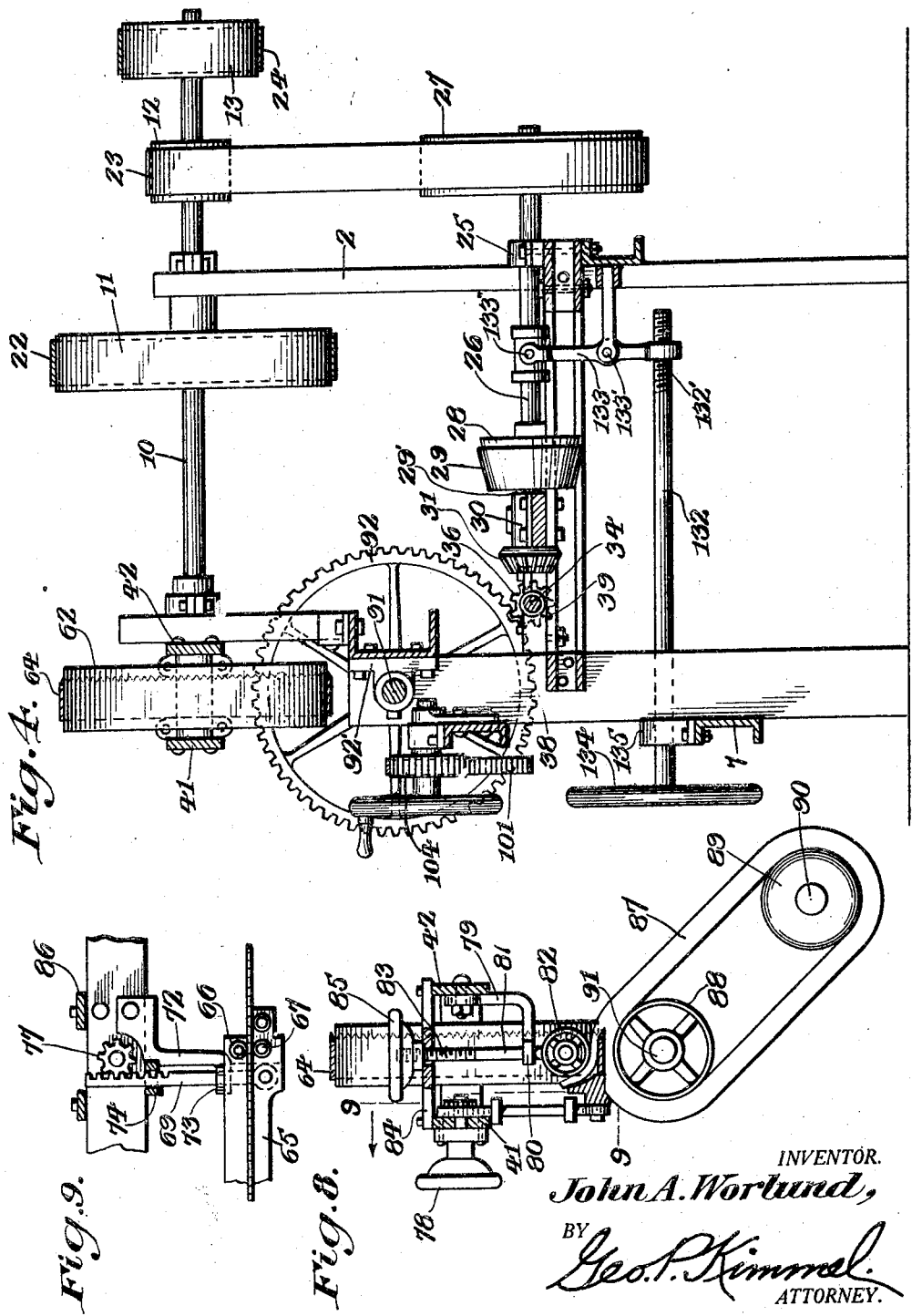

Patented Mar. 10, 1931

1,795,920

UNITED STATES PATENT OFFICE

JOHN A. WORLUND, OF WISCONSIN RAPIDS, WISCONSIN

TIRE-SPLITTING APPARATUS

Application filed June 26, 1928. Serial No. 288,429.

This invention relates to a tire splitting apparatus and has for its object to provide, in a manner as hereinafter set forth an apparatus of the class referred to whereby old or worn automobile or truck tires can be formed into endless and split reliners, boots, or patches of the desired thickness for use for tire repair work or for any purposes for which the product may be found applicable.

Further objects of the invention are to provide, in a manner as hereinafter set forth, a tire splitting apparatus which is comparatively simple in its construction and arrangement, strong, durable, compact, thoroughly efficient in its use, adjustable, conveniently operated, readily assembled and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is an end elevation of a tire splitting apparatus in accordance with this invention.

Figure 2 is a section on line 2—2 Figure 1.

Figure 3 is a section on line 3—3 Figure 2.

Figure 4 is a sectional elevation looking towards the front of the apparatus.

Figure 5 is a horizontal sectional view of the apparatus.

Figure 6 is a fragmentary view partly in section and elevation illustrating the adjusting means for one of the splitting mechanisms.

Figure 7 is a section on line 7—7 of Figure 6.

Figure 8 is a fragmentary view in section and in elevation of the splitting mechanism shown in Figures 6 and 7.

Figure 9 is a section on line 9—9 Figure 8.

Figure 10 is a fragmentary view in elevation illustrating a holding down roll for the tire.

Figure 11 is a fragmentary view in section illustrating another splitting mechanism and further showing such mechanism in active position with respect to the tire.

Figure 12 is a fragmentary view in elevation partly in section illustrating a modified form of feed roller.

The apparatus includes lower and upper tire splitting mechanisms and with the lower mechanism acting upon the tire to remove the tread thereof and to make that part from which the tread is removed smooth and further to make the remaining portion of the tire of even thickness. The upper tire splitting mechanism acts upon the remaining part of the tire to split such thickness or thicknesses therefrom as may be desired, leaving the inner thickness endless as was the tire originally.

Referring to the drawings in detail 1 generally denotes a supporting frame which includes an upright 2 at one end of the rear thereof. The upright 2 extends a substantial distance above the top of the frame 1 and extends below the top of the frame for forming one of the supporting legs thereof. The frame 1 further includes a pair of uprights at the other end thereof and which are arranged at the front and rear of such end and said uprights are indicated at 3, 4 project a substantial distance above the top of the frame and further depend below such top and constituting supports for the latter. The frame 1 further includes a support 5 for the top thereof. See Figure 5. The support 5 is arranged at that end of the frame where the upright 2 is positioned.

With reference to Figure 1 the uprights 3, 4 have secured thereto a pair of superposed. spaced channel irons 6, 7 which connect and brace said uprights 3, 4. The channel irons 6, 7 are arranged on the outer sides of the uprights 3, 4 and the inner sides of said uprights 3, 4 are connected together by a channel iron 8. See Figure 2. Mounted on the channel iron 8 is a standard 9 which opposes the upright 2. See Figure 2. Journaled in the standard 9, and also in the upright 2, as well as projecting outwardly therefrom is a driven shaft 10 carrying a drive pulley 11 and further carrying a pair of transmission pulleys 12, 13. The pulley 11 is of greater diameter than the pulley 12 and the latter is of less diameter than the pulley 13. Secured upon the channel iron 8 is an electric motor 14 for a purpose to be presently referred to. Mounted on the top of the frame 1 are a pair of vertical supports 15, 16 and secured to the top of the frame 1 and extending outwardly therefrom at an inclination is a support 17 and mounted on the supports 15, 16 and 17, as well as being secured therewith is a platform 18 upon which is mounted an electric motor 19 having the shaft thereof indicated at 20 and provided with a pulley 21 of materially less diameter than the pulley 11.

Driven from the pulley 21 is a driving belt 22 which extends around the pulley 11 and on the operation of the motor 19 the shaft 10 is driven through the operative drive connection between the motor 19 and shaft 10. Operated from the pulley 12 is a transmission belt 23 and operated from the pulley 13 is a transmission belt 24. The purpose of the belts 23 and 24 will be presently referred to.

Carried by the frame 1 at one end thereof is a bearing 25. See Figure 3. Journaled therein as well as extending therefrom is a shaft 26 carrying on its outer end a pulley 27 which is driven from the belt 23. The shaft 26 has its inner end provided with a clutching member 28 to coact with a clutching member 29 on one end of a shaft 29' for coupling the latter to shaft 26 to be driven thereby. The shaft 29' extends through a bearing 30 secured to the top of the frame 1 and the outer end of said shaft 29' is provided with a beveled pinion 31, which meshes with a beveled gear 32. See Figure 3. Journaled in bearings 33, 34 carried by the top of the frame 1 is a transmission shaft 35 having secured thereto the beveled gear 32. The shaft 35 extends rearwardly from the bearing 33 and carries a gear 36. See Figure 4. The purpose of the gear 36 will be presently referred to.

The shaft 10 extends through the support or standard 9 and that end of the shaft 10 projecting outwardly from the standard 9 is indicated at 40. See Figure 1. Loosely mounted on the end 40 of the shaft 10 is a pair of parallel, forwardly extending, spaced, flat bars 41, 42 standing on edge. See Figures 1, 2 and 4. The bars 41, 42 are provided in proximity to their forward ends with longitudinally extending slots 43 aligning with each other. The forward ends of the bars 41, 42 are positioned between the upper portions of a pair of spaced uprights 44, 45 connected together in proximity to the lower ends by combined coupling and bracing members 46, 47. See Figure 1.

Adjustably mounted between the bars 41 and 42 at the forward ends thereof is a bearing device 48 for a shaft 49. The purpose of the shaft 49 will be presently referred to. The bearing device 48 can be adjusted longitudinally with respect to the bars 41, 42, by a bolt connection 50 between said device and the slots 43 of the bars 41, 42. This arrangement is provided for the purpose of bodily shifting the shaft 49 rearwardly and forwardly with respect to the forward ends of the bars 41, 42. The bearing device 48 has depending therefrom an arm 51 having a pin and slot connection 52 with the upper end of a vertically movable adjusting member 53 for the bars 41, 42 whereby said bars can be adjusted to the dotted line position in Figure 1 and to the full line position in Figure 1. The purpose of adjusting the bars 41, 42 will be presently referred to. The lower end of the adjusting member 53 is provided with an arm 54, which projects at right angles therefrom and is formed with a vertically disposed opening 55 having a threaded wall with which engages an adjusting screw 56 mounted in a bearing 57, attached to plates 58, 59 which are arranged in spaced relation and secured to the uprights 44, 45. The lower end of the screw 56 carries a beveled pinion 60, which meshes with a beveled pinion 61 carried by a shaft 62, journaled in the uprights 44, 45 and operated by a hand wheel 63.

The upper splitting mechanism has parts thereof arranged between and carried by the bars 41, 42 and includes an operating means therefor in the form of a pulley 62 secured to the projecting portion 40 of the shaft 10 between bars 41, 42. Carried by the shaft 49 is a pulley 63 and travelling over the latter and driven from the pulley 62 is an endless cutter or knife 64 and as illustrated by way of example, a flexible band saw, but it is to be understood that any form of cutter suitable for the purpose intended may be employed. The adjusting of the bearing device 48 is for the purpose of tensioning the cutter 64.

Suspended from the bar 41 is a vertically adjustable guide device for the cutter 64 and which comprises a plate 65 standing on edge and having supported on the inner face thereof at each end, upper and lower guide rollers 66, 67, between which travels the cutter 64. The plate 65 also provides a deflector for the split portion of the tire. See Figures 1, 8 and 9. Projecting from the outer face of the plate 65 adjacent each end thereof is a stud 68 having the lower end of a vertically adjustable hanger bar 69 mounted thereon. The bars 69 are toothed at the upper portion of one edge thereof and the toothed portion of one bar 69 is indicated at 70 and formed on the inner edge thereof and the toothed portion of the other bar 69 is indicated at 71 and formed on the outer edge thereof. See Figure 1. The toothed upper portions of the bars 69 are arranged adjacent the inner face of the bar 41 and the latter has a pair of brackets 72 secured thereto and depending therefrom and each of which is formed with a right angularly disposed apertured arm 73 at its lower end and through which extends a toothed bar 69. The arm 73 provides a guide for a bar 69 and each bracket 72 is furthermore provided with an apertured guide 74 arranged above the arm 73 and through which passes a bar 69. Carried on the outer face of the bar 41 are a pair of spaced bearings 75 for stub-shafts 76 which extend through the bar 41 and carry pinions 77 on their inner ends which mesh with the toothed portions of the rods 69. The outer ends of the shafts 76 carry hand wheels 78 for the purpose of rotating the shafts whereby the pinions 77 meshing with the bars 69 will provide for the vertical adjustment thereof under such conditions elevating or lowering the plate 65. The vertical adjusting of the plate 65 will determine the thickness of the split portions of the tire, as the plate 65 carries a stretch of the cutter 64 therewith.

Secured against the inner face of the bar 42 is a pair of depending, angle shaped combined holding and guide members 79. See Figures 1 and 8. The members 79 at their lower ends extend over the saw 64, that is to say, that portion of the saw travelling between the guide rollers 66 and 67. The lower ends of the members 79 are apertured as at 80 and extending therethrough are a pair of vertically adjustable hangers 81 for a holding down roll 82, the latter coacts with the plate 65 for deflecting the split portions of the tire. See Figure 8. Each hanger 81 is peripherally threaded on its upper portion as at 83 and further each hanger extends through an apertured cross plate 84 secured upon the top edges of the bars 41, 42. See Figures 1 and 8. The upper ends of the hangers 81 have mounted thereon adjusting wheels 85 therefor to provide for the vertical adjustment of said hangers 81 for the purpose of properly positioning the holding down roll 82. See Figure 8. The bars 41, 42 are also connected by cross plates 86 secured upon the top edges thereof. See Figure 1.

Associated with the upper splitting mechanism is a feeding mechanism for the tire body 87 and which includes a feed roller 88 arranged below and in proximity to the holding down roll 82. The feed roller 88 is cylindrical, of uniform diameter and of greater diameter than the holding down roll 82. Associated with the feed roller 88, arranged below the latter and offset with respect thereto is an idling pulley 89 of spherical contour and which is carried by a shaft 90. The feed roller 88 is mounted on a shaft 91. The shaft 91 is mounted in bearings 92 connected with the supporting frame 1 of the channel shaped member 6. See Figure 1. The shaft 91 projects rearwardly from the upright 3 and carries on its rear end a gear wheel 92, which is driven from the gear 36. The shaft 91 projects rearwardly from the gear wheel 92 and carries a pulley 93 employed for driving the transmission belt 94.

The pulley 89 slides back and forth on the shaft 90 as well as revolves on the latter. The shaft 90 is connected to an adjustable carriage 95 which is slidably mounted in the top of the supporting frame 1. See Figure 5. The carriage 95 carries a support 96 for the shaft 90 and said carriage is also provided with an upstanding arm 97 to which the shaft 90 is attached. See Figure 5. The carriage 95 further includes on its upper face a tubular extension 98 having the inner face thereof threaded and passing through the extension 98, as well as threadedly engaging with the inner face thereof is an adjusting screw 99 for the carriage 95. The adjusting screw is in the form of a shaft and is mounted at one end in a bearing 100 carried by the top of the frame 1. The screw shaft 99 projects from one end of the frame 1 and carries on said projecting end a cross pinion 101. See Figures 1 and 3. Supported by the channel iron 6 is a bearing 102. See Figure 3. Mounted in and projecting from the bearing 102 is a shaft 103. See Figures 1 and 3. The shaft 103 carries a cog gear 104 for operating a transmission belt 105 for the purpose of operating the pinion 101 under such conditions revolving the screw shaft 99 and providing for the adjusting of the carriage 95. The shaft 103 has its outer end provided with a hand wheel 106, to facilitate the operation thereof. The carriage 95 travels in slideways 107 formed in the top of the supporting frame 1. See Figure 5.

The lower splitting mechanism includes a pulley 108. See Figures 1 and 3. The pulley 108 has secured to the outer edge thereof, by the holdfast devices 109 an annular knife or cutter 110 which projects inwardly from pulley 108. A drive shaft for the pulley 108 is indicated at 111 and which extends through and is journaled in an upright 112 connected to the support 5 by a channel beam 113. The shaft 111 carries an operating pulley 114 therefor and which is driven from the belt 24. A bearing element 115 is carried by the upright 112 for the shaft 111 and the latter is arranged below the pulley 89 and is disposed at right angles with respect to the shaft 90. See Figure 3.

Connected to the upright 4 and projecting forwardly therefrom is a supporting beam 116 which extends to a point in proximity to the standards or uprights 44, 45 and which is arranged below the shaft 111. Connected to the beam 116 is a bearing device 117 for the shaft 111. See dotted line showing in Figure 3. Secured to and projecting outwardly from the beam 116 are spaced supports 118, 119 and which have their outer ends connected together by a cross member 120. See Figure 3. The pulley 108, cutter 110 and shaft 111 are bodily adjustable and for such purpose a threaded, rotatable adjusting device is employed and which threadedly engages in a bracket 120' supported by the connecting member 120. See Figure 1. The shaft 111 can be slid in either direction so as to carry the pulley 108 towards and from the beam 116. The adjusting device 121 is rotatably connected to the hub 121' of the pulley 108, as at 121". Figure 2.

Associated with the lower splitting mechanism is a tire feeding mechanism therefor and which includes a frusto-elliptical shaped feed roller 122 arranged over the shaft 111 and disposed at right angles with respect thereto. The shaft for the feed roller 122 is indicated at 123. See Figure 3. The shaft 123 is carried by a yoke shaped frame 124 supported in any suitable manner from the frame 1. The end bar of the frame 124 is of circular cross section. Said end bar is indicated at 125 and arranged in advance of the feed roller 122, as well as being spaced therefrom. The shaft 123 carries a gear wheel 126 which meshes with and is driven from a gear 127 supported from the upright 4, and the gear 127 meshes with and is driven from a gear 128 carried by a shaft 129 supported in bearings 130 secured to the support or frame 1. The shaft 129 extends rearwardly from the support or frame 1 and is provided with a pulley 131 driven by the transmission belt 94.

The shaft 26 is shifted to provide for the members 28 and 29 moving into and out of clutching engagement by a forked lever 133, pivotally supported as at 133' and connected to shaft 26, as at 133". Threadedly engaging with the lower end of lever 133, as at 132' is a rotatable, threaded adjusting shaft 132 for rocking lever 133. The shaft 132 has its outer end provided with a hand wheel 134 and is mounted in a bearing 135 on the beam 7. The clutching of shafts 26 and 29' provide for the operation of the feed rollers.

The pulley 89 is common to both feed mechanisms, that is to say, is common to the feed mechanism for the upper splitting mechanism, and is common to the feed mechanism for the lower splitting mechanism.

The feed roller 122 is of such surface that if split through the center thereof the upper and lower sides are essentially arcs of the same circle as the cutting edge of the knife or cutter 110, but the vertical diameter of the feed roller 122 is much less than the diameter of such circle. The purpose of the feed roller 122 may be so modified that the remaining part of the tire will be thicker in its middle by having the circle of the surface of the feed roller 122 somewhat flattened or grooved out midway between its ends.

Figure 12 illustrates a modified form of feed roller indicated at 122' and provided at each end with a protuberance, pintle or journal 136. Fitting over the ends of the roller 122' is a pair of opposed, spaced cap members 135 which thin out the edges of the remaining part of the tire left on the feed roller. The protuberances 136 extend through the outer ends of the cap members. The feed roller 122' is of frusto-elliptical contour. The lower splitting mechanism is employed for removing the tread of the tire and to prepare the rest of the tire for further splitting by the upper tire splitting mechanism.

The tire to be de-treaded is placed around the feed roller 122 and pulley 89 and the tire is then stretched until it is held taut on feed roller 122 and pulley 89. The positioning of the tire in a taut manner is had by adjusting the carriage which carries the shaft 90 for the pulley 89. After the tire has been positioned in the manner as stated the pulley 108 with the cutter thereon is shifted towards the feed roller 122.

After the tire has been set and arranged in the manner as stated, the apparatus is put into operation and the knife or cutter 110 will split or peel off the surface of the tire as it travels around the feed roller 122.

After the tread portion of the tire has been split or peeled off, the tire is then extended from the idler pulley 89 and passed around the feed roller 88. See Figure 8. The tire is drawn taut by the adjusting of the carriage 95. When the tire is mounted on the feed roller 88 the bars 41, 42 are adjusted to the dotted line position as shown in Figure 1 and which permits the tire to be mounted on the feed roller 8 from the free end thereof. The cutter 64 is adjusted to provide for a proper thickness of the split or cutoff portion of the tire. When the tire has been positioned on the feed roller 88 and the bars 41, 42 moved to the full line position shown in Figure 1, the apparatus is again thrown in operation and the saw will split off the desired thicknesses from the tire. After each operation of the upper splitting mechanism the plate 65 is adjusted so that successive thicknesses can be split from the tire. It will be observed that the operation of the upper splitting mechanism is such that it leaves the inner part of the split tire as an endless band of fabric, and such endless band can be used as a reliner, as endless reliners are very desirable for use, because the reliners which have split ends work apart in the tire and cause much trouble.

A sharpening or abrading device 137, operated from the motor 14, is provided for the cutter 64. See Figures 1 and 2. A sharpening or abrading device 138 is provided for the knife or cutter 110. See Figure 1.

Suitable switches, not shown, are employed in connection with the circuit connections for the motors 14 and 19.

The lower and upper splitting mechanisms, as well as the lower and upper feeding mechanisms, are operatively connected with the shaft 10 whereby the said several mechanisms are driven from the same source.

It is thought the many advantages of an apparatus for splitting tires, in accordance with this invention can be readily understood, and although the preferred embodiment of the invention is as illustrated and described, yet it is to be understood that changes in the details of construction can be had which fall within the scope of the invention as claimed.

What I claim is:—

1. In a tire splitting apparatus a supporting structure provided with a guideway, a support disposed at right angles to said structure and projecting outwardly therefrom, an adjustable carriage slidable within said guideway, rotatable means mounted in said structure and engaging with said carriage for adjusting it, a shaft fixed to the carriage and extending at right angles thereto and opposing said support, a rotatable tire feed roller disposed on an axis parallel to said shaft, mounted in said support and of frusto-elliptical contour, a bodily adjustable, rotatable, annular cutter for overlapping said roller and for splitting the tire fed thereby, and an idler pulley revolubly and slidably mounted on said shaft, spaced from and coacting with the feed roller for maintaining the tire flat when acted upon by said cutter.

2. In a tire splitting apparatus a supporting structure provided with a guideway, a support disposed at right angles to said structure and projecting outwardly therefrom, an adjustable carriage slidable within said guideway, rotatable means mounted in said structure and engaging with said carriage for adjusting it, a shaft fixed to the carriage and extending at right angles thereto and opposing said support, a rotatable tire feed roller disposed on an axis parallel to said shaft, mounted in said support and of frusto-elliptical contour, a bodily adjustable, rotatable, annular cutter for overlapping said roller and for splitting the tire fed thereby, and an idler pulley revolubly and slidably mounted on said shaft, spaced from and coacting with the feed roller for maintaining the tire flat when acted upon by said cutter, the width of said feed roller being greater than that of said pulley whereby the tire being split can be selectively positioned upon different portions of the periphery of the feed roller.

3. In a tire splitting apparatus an annular cutter for splitting a tire, a pulley having said cutter fixed thereto, said cutter projecting inwardly from said pulley, a shaft for driving said pulley, means at one end of said shaft for operating it, means at the other end of said shaft for bodily adjusting it whereby the cutter is carried therewith, supporting means for said shaft, a supporting structure provided with a guideway, an adjustable carriage sliding in said guideway, means carried by said supporting structure and engaging the carriage for adjusting it, a support extending forwardly at right angles to said supporting structure and arranged over said shaft, a frusto-elliptical feed roller disposed on an axis at right angles to the axis of said cutter and revolubly mounted in said support, said roller adapted to be overlapped by the cutter when the latter is splitting the tire, and a shaft fixed to said carriage, extending at right angles thereto and disposed in parallel spaced relation to the axis of said roller, and an idler pulley revolubly and slidably mounted on said last mentioned shaft and spaced from and coacting with the feed roller for maintaining the tire flat during the splitting operation.

4. In a tire splitting apparatus an annular cutter for splitting a tire, a pulley having said cutter fixed thereto, said cutter projecting inwardly from said pulley, a shaft for driving said pulley, means at one end of said shaft for operating it, means at the other end of said shaft for bodily adjusting it whereby the cutter is carried therewith, supporting means for said shaft, a supporting structure provided with a guideway, an adjustable carriage sliding in said guideway, means carried by said supporting structure and engaging the carriage for adjusting it, a support extending forwardly at right angles to said supporting structure and arranged over said shaft, a frusto-elliptical feed roller disposed on an axis at right angles to the axis of said cutter and revolubly mounted in said support, said roller adapted to be overlapped by the cutter when the latter is splitting the tire, and a shaft fixed to said carriage, extending at right angles thereto and disposed in parallel spaced relation to the axis of said roller, an idler pulley revolubly and slidably mounted on said last mentioned shaft and spaced from and coacting with the feed roller for maintaining the tire flat during the splitting operation, and the width of said feed roller being greater than that of the pulley on the last mentioned shaft thereby selectively providing for the tire to be supported on the feed roller by different portions of the periphery of the latter.

5. In a tire splitting apparatus a bodily adjustable, rotatable, annular cutter for splitting a tire, a supporting structure, provided with a guideway, an adjustable carriage slidable in said guideway, a support extending forwardly at right angles to said supporting means, a frusto-elliptical tire feed roller disposed on an axis at right angles to the axis of said cutter and adapted to be overlapped by the latter when the cutter is splitting the tire, a shaft bodily carried by said carriage, extending at right angles thereto and disposed in parallel, spaced relation with respect to the axis of said feed roller, an idler pulley revolubly and slidably mounted on said shaft and spaced from and coacting with the feed roller for maintaining the tire flat during the splitting operation, driving means for said cutter, supporting means for said driving means projecting from said supporting structure, driving means carried by said support for said feed roller, and a common operating means for the said driving means.

6. In a tire splitting apparatus a bodily adjustable, rotatable, annular cutter for splitting a tire, a supporting structure provided with a guideway, an adjustable carriage slidable in said guideway, a support extending forwardly at right angles to said supporting means, a frusto-elliptical tire feed roller disposed on an axis at right angles to the axis of said cutter and adapted to be overlapped by the latter when the cutter is splitting the tire, a shaft bodily carried by said carriage, extending at right angles thereto and disposed in parallel spaced relation with respect to the axis of said feed roller, an idler pulley revolubly and slidably mounted on said shaft and spaced from and coacting with the feed roller for maintaining the tire flat during the splitting operation, driving means for said cutter, supporting means for said driving means projecting from said supporting structure, driving means carried by said support for said feed roller, and a common operating means for said driving means, the width of said feed roller being greater than that of said pulley to provide for selectively positioning a tire upon portions of the periphery of the feed roller, said cutter being of a diameter materially greater than the width of said support to overlap the latter when cutting the tire.

In testimony whereof, I affix my signature hereto.

JOHN A. WORLUND.